US007759829B2

(12) United States Patent
Holter et al.

(10) Patent No.: US 7,759,829 B2
(45) Date of Patent: Jul. 20, 2010

(54) INDUSTRIAL MOTOR ASSEMBLY COMPRISING A VENTED ROTOR SHAFT

(75) Inventors: Warren G. Holter, Cincinatti, OH (US); Scott Kreitzer, Maineville, OH (US); Brian Pellegrino, Cincinnati, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 92 days.

(21) Appl. No.: 10/878,506

(22) Filed: Jun. 28, 2004

(65) Prior Publication Data

US 2005/0067918 A1    Mar. 31, 2005

Related U.S. Application Data

(60) Provisional application No. 60/482,622, filed on Jun. 26, 2003.

(51) Int. Cl.
  *H02K 1/32*    (2006.01)
(52) U.S. Cl. .................. 310/61; 310/216.121; 310/64
(58) Field of Classification Search .............. 310/61, 310/58, 59, 64, 261, 261.01, 216.121–216.123, 310/216, 51
  See application file for complete search history.

(56) References Cited

U.S. PATENT DOCUMENTS

| 886,035 | A | * | 4/1908 | Behrend | 310/262 |
| 959,550 | A | * | 5/1910 | Kaczor et al. | 310/61 |
| 2,295,409 | A | * | 9/1942 | Kreh, Jr. | 310/236 |
| 3,650,167 | A | * | 3/1972 | Hoffmeyer et al. | 83/41 |
| 3,675,056 | A | * | 7/1972 | Lenz | 310/54 |
| 3,784,851 | A | * | 1/1974 | Fujii | 310/58 |
| 3,870,912 | A | * | 3/1975 | Kipke et al. | 310/183 |
| 3,921,018 | A | * | 11/1975 | Frankenhauser | 310/270 |
| 3,997,803 | A | * | 12/1976 | Mishra | 310/59 |
| 4,311,931 | A | * | 1/1982 | Fujioka et al. | 310/55 |
| 4,409,506 | A |   | 10/1983 | Ito | 310/166 |
| 4,443,723 | A | * | 4/1984 | Ohkubo | 310/53 |
| 4,585,967 | A | * | 4/1986 | Mayer et al. | 310/217 |
| 4,751,417 | A |   | 6/1988 | Krinickas | 310/211 |
| 5,045,742 | A | * | 9/1991 | Armstrong et al. | 310/254 |
| 5,861,700 | A |   | 1/1999 | Kim | 310/261 |
| 6,340,853 | B1 | * | 1/2002 | Kaiho et al. | 310/61 |
| 6,483,210 | B1 |   | 11/2002 | Soderberg | 310/52 |
| 2005/0067918 | A1 | * | 3/2005 | Holter et al. | 310/261 |

FOREIGN PATENT DOCUMENTS

EP    0726637 A2    1/1996

(Continued)

OTHER PUBLICATIONS

"Electric Motors and Generators, Illustrated", Emery et al., Philospohical Library, Sep. 1959, p. 28, 29.*

(Continued)

*Primary Examiner*—Karl I Tamai
(74) *Attorney, Agent, or Firm*—Filip A. Kowalewski (57) ABSTRACT

Certain exemplary embodiments comprise a device and/or an electric motor comprising an elongated, substantially rigid rotor shaft, the rotor shaft defining a plurality of longitudinal flutes; and/or a method comprising: for an electrical motor, forming an elongated, substantially rigid, rotor shaft defining a plurality of longitudinal flutes; and assembling the rotor shaft with a stator of the electrical motor.

26 Claims, 5 Drawing Sheets

FOREIGN PATENT DOCUMENTS

| | | | |
|---|---|---|---|
| EP | 19905540 A1 | | 8/2000 |
| JP | 62-189929 | * | 8/1987 |
| JP | 62239838 A | * | 10/1987 |
| JP | 04-244762 | * | 9/1992 |
| JP | 10-309064 A | | 11/1998 |

OTHER PUBLICATIONS

Finley et al., "An Analytical Approach to Solving Motor Vibration Problems" IEEE Transactions on Industry Applications, vol. 36, No. 5, Sep./Oct. 2000.*

Engelmann et al., "Handbook of Electric Motors"), pp. 617-628, 1995 ( no month provided), Marcel Dekker, Inc.*

Davis et al., "NEMA Induction Motor Vibration Measurement: A Comparison of Methods With Anaylsis", IEEE Paper PCIC-93-23; Jun. 1993.*

Dennis H. Shreve, "Introduction to Vibration Technology", Nov. 1994. p. 1-18.*

PCT—International Search Report—mailed Nov. 29, 2004.

PCT Patent Cooperation Treaty—Written Opinion of the Int'l Searching Authority.

* cited by examiner

Fig. 7 es; and/or a method comprising: for an electrical motor, forming an elongated, substantially rigid, rotor shaft defining a plurality of longitudinal flutes; and assembling the rotor shaft with a stator of the electrical motor.

INDUSTRIAL MOTOR ASSEMBLY COMPRISING A VENTED ROTOR SHAFT

CROSS-REFERENCES TO RELATED APPLICATIONS

This application claims priority to, and incorporates by reference herein in its entirety, pending U.S. Provisional Patent Application Ser. No. 60/482,622, filed 26 Jun. 2003.

BACKGROUND

U.S. Pat. No. 4,409,506 (Ito), which is incorporated by reference herein in its entirety, allegedly recites that "[w]hen an induction motor is speed-controlled with a variable frequency power supply including thyristor inverters, operating loss due to harmonics components is increased in a rotor of the induction motor. In order to diverge additional operating loss into an appreciable depth of the rotor to thereby suppress the increase in the operating loss, the rotor comprises a cylindrical member having a circumferential resistivity which is larger than axial and radial resistivities and circumferential permeability which is smaller than axial and radial permeabilities, and a core disposed in the cylindrical member and having an axial permeability which is smaller than circumferential and radial permeabilities." See Abstract.

U.S. Pat. No. 4,751,417 (Krinickas), which is incorporated by reference herein in its entirety, allegedly recites that "[i]n order to improve the efficiency of electric machines, by reducing losses caused by eddy currents induced by high frequency fluxes, the outer surface of the rotor, including the rotor pole face, has a plurality of circumferential grooves. The grooves are provided in axially spaced relation along the rotor. Preferably, the method of reducing losses includes the step of forming the grooves by laser cutting, which permits the width and spacing of the grooves to be minimized so as to maximize loss reduction by increasing resistance to eddy currents." See Abstract.

U.S. Pat. No. 5,861,700 (Kim), which is incorporated by reference herein in its entirety, allegedly recites a "rotor for an induction motor includes a core having a central hole extending axially therethrough for receiving a shaft. A plurality of large spaces are formed in the core radially outside of the center hole. The spaces are filled with a non-ferrous metal, and blowholes extend through the non-ferrous metal for conducting cooling air through the core." See Abstract.

U.S. Pat. No. 6,483,210 (Soderberg), which is incorporated by reference herein in its entirety, allegedly recites that "[t]he invention relates to a method of improving the performance of a rotary electric machine through improved cooling, whereby a cooling fluid is conducted through axial cooling channels (15) in the rotor, radially inwardly of the rotor winding grooves (14), whereby the cooling fluid being mainly active in cooling the machine is conducted through axial cooling channels (15), or alternatively groups of cooling channels, that are provided essentially symmetrically with reference to the magnetic flow paths in the rotor, for achieving a symmetry in the magnetic circuit and thereby good electrical properties for the machine. The invention is also directed to a rotary electric machine, a rotor therefor and a use thereof." See Abstract.

SUMMARY

Certain exemplary embodiments comprise a device and/or an electric motor comprising an elongated, substantially rigid rotor shaft, the rotor shaft defining a plurality of longitudinal flutes; and/or a method comprising: for an electrical motor, forming an elongated, substantially rigid, rotor shaft defining a plurality of longitudinal flutes; and assembling the rotor shaft with a stator of the electrical motor.

BRIEF DESCRIPTION OF THE DRAWINGS

A wide variety of potential embodiments will be more readily understood through the following detailed description of certain exemplary embodiments, with reference to the accompanying drawings in which.

DEFINITIONS

When the following terms are used herein, the accompanying definitions apply:

alternating current—an electric current that reverses direction in a circuit at regular intervals.

can—is capable of, in at least some embodiments.

comprising—including but not limited to.

core—a plurality of thin laminations stacked together to form a long hollow cylinder. The core can include a plurality of windings, each of which is constructed of wound insulated wire, the windings residing in slots in the stacked laminations.

critical speed—a speed at which mechanical resonance occurs.

electric motor—a motor powered by electricity. An electric motor can comprise two members, one stationary, called the stator, and the other rotating, called the rotor. Either member can utilize one or more magnets, electromagnets, and/or ferromagnetic components.

elongated—having more length than width.

expected—predicted.

flute—a elongated groove.

flute depth—a radial depth of a longitudinally extending groove in a rotor shaft.

longitudinal—of or relating to longitude or length.

may—is allowed to, in at least some embodiments.

motor—something that converts electricity to linear and/or angular motion.

operating speed—a speed of operation, which is typically between a synchronous speed and a full-load speed.

phase—a number of portions of a complete rotational cycle of a machine. Also, a fraction of a complete cycle elapsed as measured from a specified reference point and often expressed as an angle.

pole—one of two or more regions in a magnetized body at which the magnetic flux density is concentrated.

predetermined—established in advance.

rigid—substantially inflexible.

rotor—a rotating part of a machine.

shaft—a long, generally cylindrical bar that rotates, and to which a rotor can be coupled.

speed—a linear or rotational velocity.

stator—a stationary part in or about which another part (the rotor) revolves.

substantially—to a great extent or degree.

system—a collection of mechanisms, devices, and/or instructions, the collection designed to perform one or more specific functions.

totally enclosed fan cooled (TEFC) motor—a substantially enclosed machine equipped for self-exterior cooling by means of a fan or fans integral with the machine but external to the enclosing parts. Most TEFC motors have external fins to increase the heat dissipation from the exterior surfaces.

DETAILED DESCRIPTION

Certain exemplary embodiments provide a motor assembly comprising a longitudinally fluted rotor shaft. The fluted rotor shaft can provide an equivalent shaft diameter that is large enough to provide a critical speed well above a defined operating speed of the motor. For the cross sectional venting area they provide, the deep large slots of the fluted shaft can provide relatively low friction losses and/or relatively good overall airflow. The width of the flutes can be a standard milling cutter width.

Figure 1:
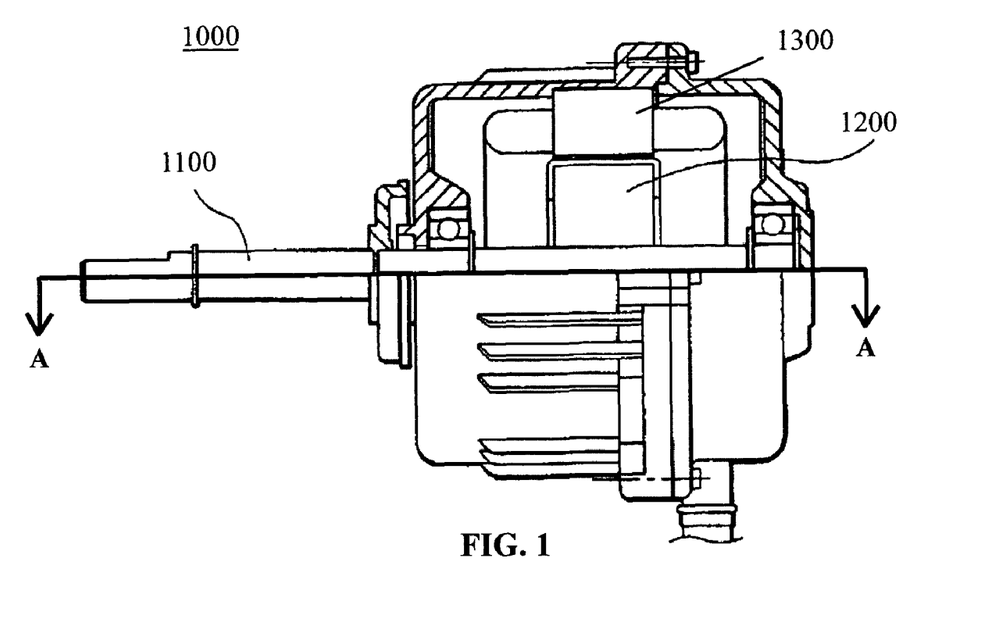
FIG. 1 is a side view of an exemplary embodiment of a motor 1000.

FIG. 1 is a side view of an exemplary embodiment of a motor 1000, which can comprise a fluted rotor shaft 1100, a rotor core 1200, and a stator core 1300. Motor 1000 can be of any style, such as alternating current, direct current, dripproof, fan-cooled, internally vented, totally-enclosed, etc. Motor 1000 can operate with any number of phases, such as 1, 2, 3, etc. Motor 1000 can have any number of poles, such as 1, 2, 3, 4, etc. Motor 1000 can have any horsepower rating, such as from approximately 0.1 horsepower to approximately 2000 horsepower, including all subranges and values therebetween.

Figure 2:
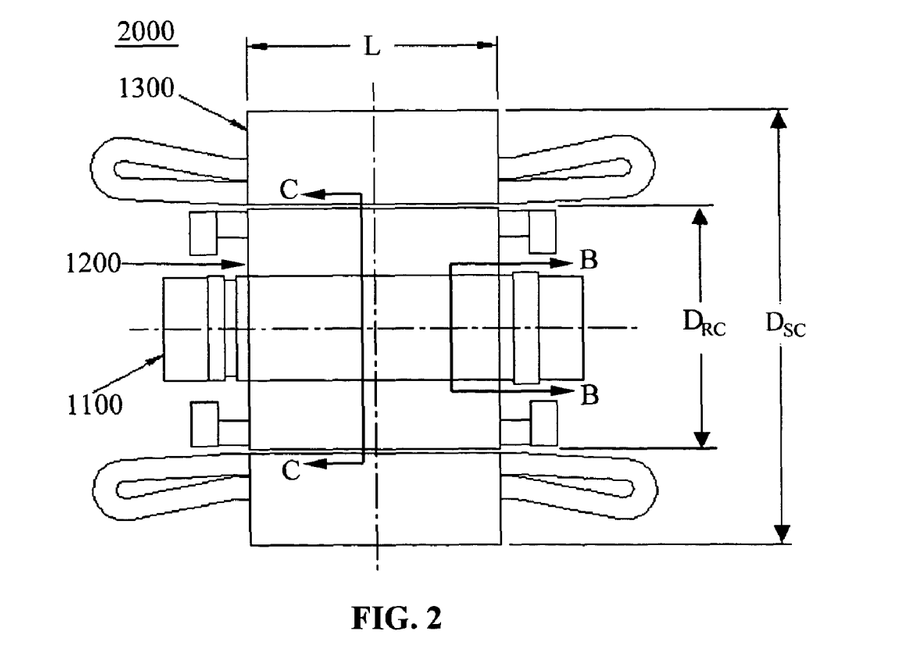
FIG. 2 is a cross-sectional view taken at section line A-A of FIG. 1.

FIG. 2 is a cross-sectional view taken at section line A-A of FIG. 1. As shown, rotor core 1200 has a diameter $D_{RC}$, and stator core 1300 has a diameter $D_{SC}$. Rotor core 1200 and stator core 1300 have a length L. A ratio of L to $D_{SC}$ can range from approximately 1.25 to approximately 2.0, including all subranges and values therebetween.

Figure 3:
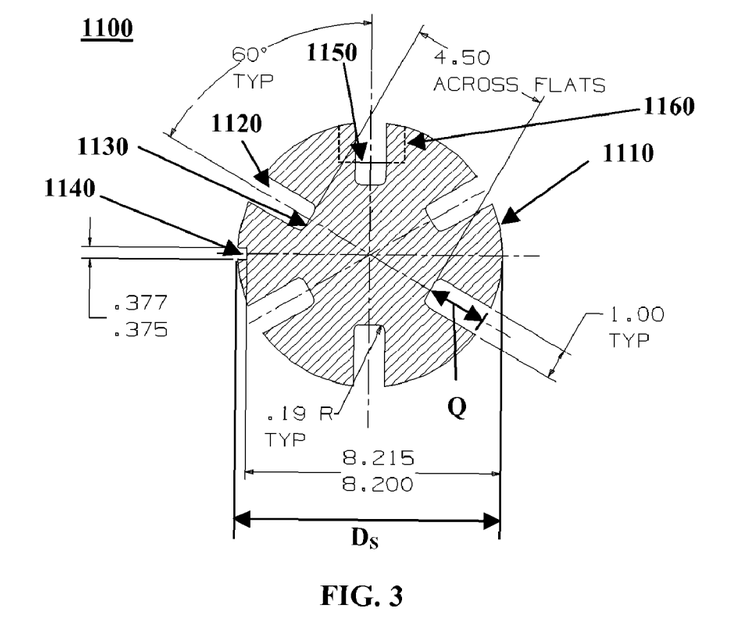
FIG. 3 is a cross-sectional view taken at section line B-B of FIG. 2.

FIG. 3 is a cross-sectional view of an exemplary embodiment of a rotor shaft 1100 taken at section line B-B of FIG. 2. As shown, rotor shaft 1100 can comprise a plurality of equally-spaced rotor sectors 1110 separated by a plurality of equally-spaced, longitudinally extending, rotor shaft flutes 1120 that can be formed by milling rotor shaft 1100 with a milling tool of an appropriate width. Rotor shaft 1100 can define a diameter $D_S$, and rotor shaft flutes 1120 can define a depth Q, that is further defined by rotor shaft flute bottoms 1130. A ratio of Q to $D_S$ can ran from approximately 0.15 to approximately 0.35, including all values and subranges therebetween, such as from approximately 0.185 to approximately 0.3; from approximately 0.2 to approximately 0.28, from approximately 0.25 to approximately 0.32, etc.

Rotor shaft flutes 1120 can extend along rotor shaft at least a length L of rotor core 1200 (shown in FIG. 2), and can gradually decrease in depth and/or increase in width through larger width 1150 and/or smaller depth 1160 until indistinguishable from rotor shaft 1100, thereby allowing a smooth transition for air entering flutes 1120 to cool rotor shaft 1100 and/or core 1200. A shaft keyway 1140 can allow rotor shaft 1100 to couple with a rotor core 1200 (shown in FIG. 4).

Figure 4:
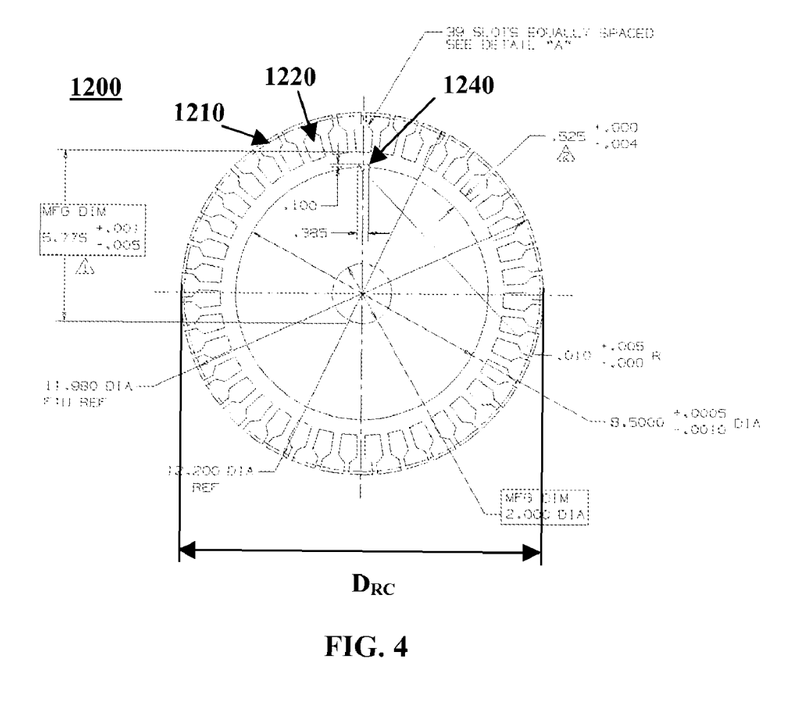
FIG. 4 is a cross-sectional view taken at section line C-C of FIG. 2.

FIG. 4 is a cross-sectional view taken at section line C-C of FIG. 2, showing an exemplary embodiment of a rotor lamination stack and/or rotor core 1200, which can comprise a plurality of equally-spaced rotor core sectors 1210 separated by a plurality of equally-spaced, longitudinally extending, rotor core slots 1220, which can contain core windings (not shown). Rotor core 1200 can define a core diameter $D_{RC}$ and a core length L (shown in FIG. 2). A core keyway 1240 can allow rotor core 1200 to couple with a rotor shaft 1100 (shown in FIG. 3).

Figure 5:
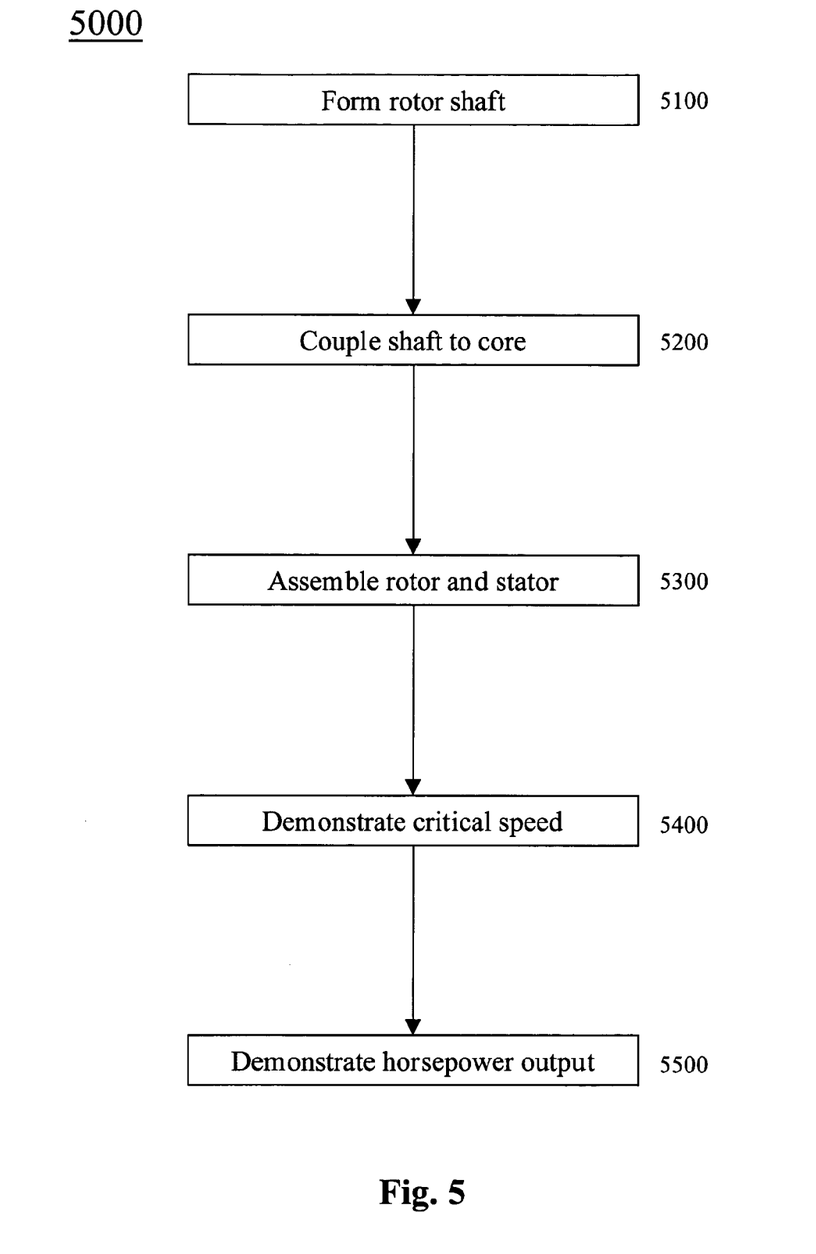
FIG. 5 is a flowchart of an exemplary embodiment of a method 5000.
Figure 6:
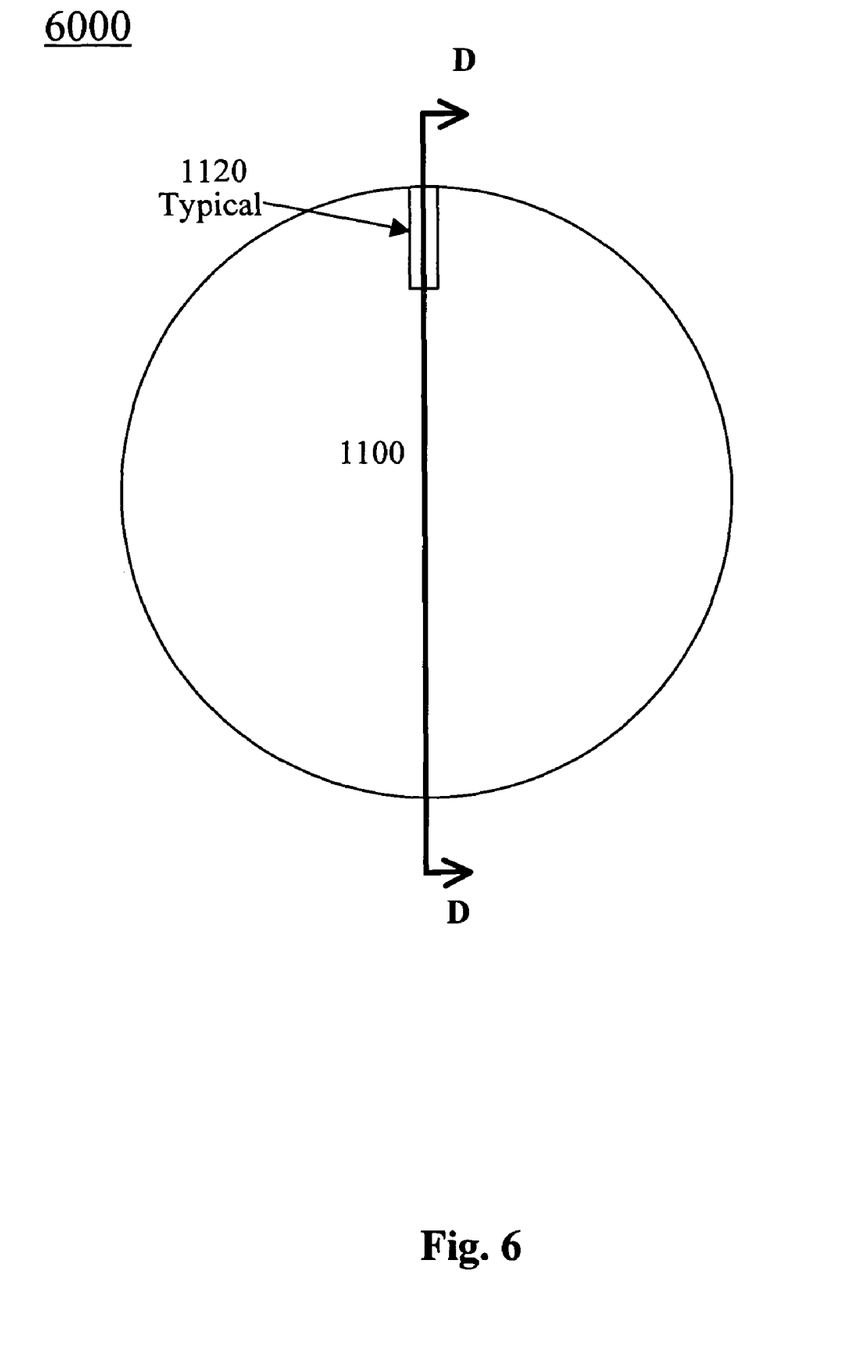
FIG. 6 is a cross-sectional view of an exemplary shaft illustrating a typical flute of an exemplary embodiment.
Figure 7:
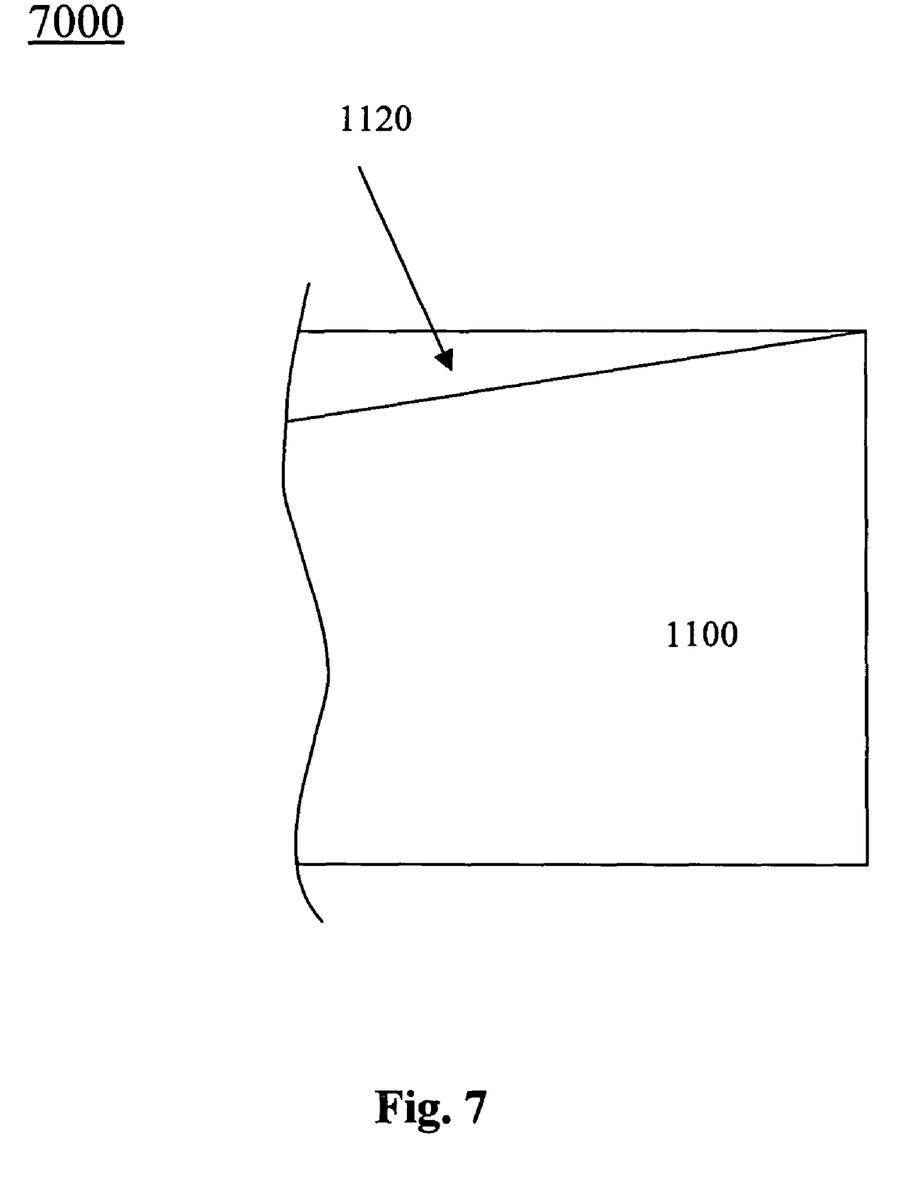
FIG. 7 is a cross-sectional view taken at section line D-D of FIG. 6.

FIG. 5 is a flowchart of an exemplary embodiment of a method 5000. At activity 5100, an elongated, substantially rigid, rotor shaft defining a plurality of longitudinal flutes can be formed. A ratio of a depth of each flute to a diameter of the shaft can be greater than approximately 0.15. At activity 5200, the rotor shaft can be coupled with a rotor core to form a rotor. At activity 5300, the rotor can be assembled with a stator of the electrical motor. At activity 5400, a functional motor can demonstrate a critical speed that is at least 115% of an expected and/or actual full operating speed of the rotor. At activity 5500, a functional motor can demonstrate an increased horsepower output and/or rating compared an otherwise equivalent motor that defines a Q to $D_S$ ratio of less than 0.15. The horsepower increase can be from approximately 15 percent to approximately 50 percent, including all values and subranges therebetween.

The following Tables 1 through 8 reflect design and performance values for an exemplary 2 pole motor comprising an elongated, substantially rigid fluted rotor shaft as described herein. The exemplary motor had a rotor shaft diameter of 8.5 inches, a rotor core diameter of 11.98 inches, and a rotor core length of 32 inches. The exemplary motor also had 6 flutes in the rotor shaft, each of which was 2 inches deep and 1 inch wide. The exemplary motor also had a stator core outer diameter of 21.64 inches, and a stator core length of 32 inches, for an L/D ratio of approximately 1.5.

TABLE 1

Nameplate Rating

| Rated HP | Service Factor | Rated RPM | Voltage | Freq Hz./Ph |
|---|---|---|---|---|
| 900 | 1.0 | 3576 | 4600 | 60/3 |

| Amps | Insulation Class | Temp. Rise (° C.) | Duty | Type | Frame |
|---|---|---|---|---|---|
| 94.6 | F | 80 | Cont. | CZ | 5013 |

TABLE 2

Temperature Test

Conditions of Test

| Hours Run | Line Volts | Line Amps | Cooling Air (° C.) |
|---|---|---|---|
| 5.5 | 4596 | 94.6 | 28.3 |

Temperature Rise, (° C.)

| Stator Winding Rise by | Temperature Rise | ODE Brg. | DE Brg. |
|---|---|---|---|
| Resistance | 67.4 | 46.0 | 49.9 |

TABLE 3

Test Characteristics
No Load

| Rated Slip in Percent | Current (amperes) | Power (kilowatts) | Resistance between lines (ohms @ 25° C.) |
|---|---|---|---|
| .59 | 19.6 | 12.1 | .2621 |

TABLE 4

Torque and Starting Current

| Breakdown Torque (lb.-ft.) | Locked Rotor Torque | | Starting Current | |
|---|---|---|---|---|
| 2380 | 152 | lb.-ft. @ 51.1 % Volts | 253 | Amps @ 51.1 % Volts |

TABLE 5

Efficiency & Power Factor

| Load | Rated | 75% | 50% |
|---|---|---|---|
| Efficiency (%) | 96.4 | 96.3 | 95.7 |
| Power Factor (%) | 89.8 | 89.1 | 85.4 |

TABLE 6

Insulation Tests
Resistance Test

| Megohms | Volts |
|---|---|
| 19300 | 2500 |

TABLE 7

No Load Vibration Levels—unfiltered
Velocity—Inches per Second

| Housing: | Opposite Drive End | Drive End |
|---|---|---|
| Vertical | .066 | .045 |
| Horizontal | .064 | .049 |
| Axial | .006 | .009 |

TABLE 8

No Load Vibration Levels—unfiltered
Amplitude—Mils Peak-to-Peak

| Shaft: | Opposite Drive End | Drive End |
|---|---|---|
| Vertical | — | .072 |
| Horizontal | — | .561 |

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render any claim seeking priority hereto invalid, then any such conflicting information in such incorporated by reference material is specifically not incorporated by reference herein.

What is claimed is:

1. A device, comprising:
an elongated, substantially rigid rotor shaft of an electrical motor, said rotor shaft defining a plurality of longitudinal flutes, a ratio of a depth of each flute to a diameter of the shaft greater than approximately 0.15 and less than approximately 0.35, each of said plurality of longitudinal flutes gradually decreasing in depth and increasing in width along a length of said rotor shaft until substantially indistinguishable from said rotor shaft, a critical speed of said rotor shaft greater than an expected operating speed of said rotor shaft, and said rotor shaft, when rotated without load at said expected operating speed, adapted to cause a vertical vibration velocity of a drive end of a housing of said electrical motor to be less than 0.045 inches per second.

2. The device of claim 1, wherein the ratio is greater than approximately 0.20.

3. The device of claim 1, wherein the ratio is greater than approximately 0.25.

4. The device of claim 1, wherein the ratio is greater than approximately 0.30.

5. The device of claim 1, wherein the ratio is less than 0.35.

6. A system, comprising:
an electrical motor comprising an elongated, substantially rigid, rotor shaft defining a plurality of longitudinal flutes, a ratio of a depth of each flute to a diameter of the shaft greater than approximately 0.15 and less than approximately 0.35, each of said plurality of longitudinal flutes gradually decreasing in depth and increasing in width along a length of said rotor shaft until substantially indistinguishable from said rotor shaft, a critical speed of said rotor shaft greater than an expected operating speed of said rotor shaft, and said rotor shaft, when rotated without load at said expected operating speed, adapted to cause a vertical vibration velocity of a drive end of a housing of said electrical motor to be less than 0.045 inches per second.

7. The system of claim 6, wherein the ratio is greater than approximately 0.20.

8. The system of claim 6, wherein the ratio is greater than approximately 0.25.

9. The system of claim 6, wherein the ratio is greater than approximately 0.30.

10. The system of claim 6, wherein the ratio is less than 0.35.

11. The system of claim 6, wherein the motor is an enclosed motor.

12. The system of claim 6, wherein the motor is a fan-cooled motor.

13. The system of claim 6, wherein the motor is a two pole motor.

14. The system of claim 6, wherein the motor is a multi-pole motor.

15. The system of claim 6, wherein the motor is a single phase motor.

16. The system of claim 6, wherein the motor is a multiphase motor.

17. The system of claim 6, wherein a ratio of a length of a stator core of the motor to an outer diameter of the stator core is approximately 1.25 to approximately 2.0.

18. The system of claim 6, wherein said critical speed of said rotor shaft is at least 115 percent of said expected operating speed of said rotor shaft.

19. The system of claim 6, wherein a horsepower rating of said motor is at least 115 percent of an otherwise equivalent motor defining a ratio of less than 0.15.

20. The system of claim 6, wherein a horsepower rating of said motor is at least 120 percent of an otherwise equivalent motor defining a ratio of less than 0.15.

21. The system of claim 6, wherein a horsepower rating of said motor is at least 125 percent of an otherwise equivalent motor defining a ratio of less than 0.15.

22. A method comprising a plurality of activities, comprising:

for an electrical motor, forming an elongated, substantially rigid, rotor shaft defining a plurality of longitudinal flutes, a ratio of a depth of each flute to a diameter of the shaft greater than approximately 0.15 and less than approximately 0.35, each of said plurality of longitudinal flutes gradually decreasing in depth and increasing in width along a length of said rotor shaft until substantially indistinguishable from said rotor shaft, a critical speed of said rotor shaft greater than an expected operating speed of said rotor shaft, and, said rotor shaft, when rotated without load at said expected operating speed, adapted to cause a peak-to-peak vertical vibration amplitude of a drive end of said rotor shaft to be less than 0.072 mils; and coupling the rotor shaft with a rotor core of the electrical motor to form a rotor.

23. The method of claim 22, further comprising assembling the rotor with a stator of the electrical motor.

24. The method of claim 22, wherein said critical speed of said rotor is at least 115 percent of said expected operating speed of said rotor.

25. A device, comprising:

an elongated, substantially rigid rotor shaft for an electrical motor, a critical speed of said rotor shaft at least 115 percent of an expected operating speed of said rotor shaft, said rotor shaft defining a plurality of longitudinal flutes, a ratio of a depth of each flute to a diameter of the shaft greater than approximately 0.15 and less than approximately 0.35, each of said plurality of longitudinal flutes gradually decreasing in depth and increasing in width along a length of said rotor shaft until substantially indistinguishable from said rotor shaft and, said rotor shaft, when rotated without load at said expected operating speed, adapted to cause a peak-to-peak horizontal vibration amplitude of a drive end of said rotor shaft to be less than 0.561 mils.

26. The device of claim 25, wherein:

a ratio of a diameter of said substantially rigid rotor shaft to a diameter of a rotor core of said electrical motor is approximately 0.71.

* * * * *